(12) United States Patent
Misra et al.

(10) Patent No.: US 11,880,845 B2
(45) Date of Patent: Jan. 23, 2024

(54) SYSTEM, METHOD, AND COMPUTER PROGRAM PRODUCT FOR REAL-TIME ACCOUNT LEVEL RULE EXCLUSION FOR REAL-TIME PAYMENTS

(71) Applicant: Visa International Service Association, San Francisco, CA (US)

(72) Inventors: Navendu Misra, Austin, TX (US); Kavish Agarwal, Austin, TX (US); Nipun Agarwal, Austin, TX (US); Juharasha Shaik, Fremont, CA (US); Praveen Kumar Suresh Guggarigoudar, Cedar Park, TX (US); Ravi Rameshbhai Alagiya, Austin, TX (US); Rajiv Ranjan, Foster City, CA (US); Durga S. Kala, Cupertino, CA (US); Andrey Masharov, San Bruno, CA (US); Xuepeng Li, Foster City, CA (US); Anuvind Pushpak, London (GB); Marc Corbalan Vila, London (GB); Stuart Mark Williams, London (GB)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 17/675,061

(22) Filed: Feb. 18, 2022

(65) Prior Publication Data
US 2023/0267471 A1    Aug. 24, 2023

(51) Int. Cl.
*G06Q 20/40*    (2012.01)
*G06Q 20/32*    (2012.01)
*G06Q 20/38*    (2012.01)
*H04L 29/06*    (2006.01)
*G06Q 50/00*    (2012.01)
(Continued)

(52) U.S. Cl.
CPC ......... *G06Q 20/407* (2013.01); *G06Q 20/102* (2013.01); *G06Q 20/4016* (2013.01)

(58) Field of Classification Search
CPC . G06Q 20/407; G06Q 20/102; G06Q 20/4016
See application file for complete search history.

(56) References Cited

U.S. PATENT DOCUMENTS

10,242,540 B2 * 3/2019 Chen .................. G06Q 20/4016
10,867,303 B1 * 12/2020 Manapat ............. G06Q 20/405
(Continued)

*Primary Examiner* — Daniel S Felten
*Assistant Examiner* — Douglas W Pinsky
(74) *Attorney, Agent, or Firm* — The Webb Law Firm (57) ABSTRACT

Systems, methods, and computer program products may store, in a distributed cache, a rule associated with a plurality of accounts in a Real-Time Payments (RTP) network, the rule being stored in association with account data associated with the plurality of accounts; receive an account level exclusion directive associated with the account; store, in the distributed cache, the account level exclusion directive in association with the account; receive transaction data associated with a transaction in the RTP network between the account and another account; retrieve, from the distributed cache, the rule, the account level exclusion directive, and the account data associated with the account; exclude, based on the account level exclusion directive, use of the rule for processing the transaction; and process, without applying the rule, the transaction in the RTP network.

12 Claims, 4 Drawing Sheets

(51) Int. Cl.
*G06F 16/28* (2019.01)
*G06Q 20/04* (2012.01)
*G06Q 20/34* (2012.01)
*G06Q 20/10* (2012.01)

(56) References Cited

U.S. PATENT DOCUMENTS

| | | | |
|---|---|---|---|
| 11,556,936 B1* | 1/2023 | Fisher | G06Q 20/357 |
| 2002/0156724 A1* | 10/2002 | Levchin | G06Q 40/04 |
| | | | 705/39 |
| 2010/0169137 A1* | 7/2010 | Jastrebski | G06Q 20/04 |
| | | | 705/30 |
| 2012/0101930 A1* | 4/2012 | Li | G06Q 40/02 |
| | | | 705/35 |
| 2013/0080364 A1* | 3/2013 | Wilson | G06N 5/02 |
| | | | 706/46 |
| 2014/0129357 A1* | 5/2014 | Goodwin | G06Q 30/02 |
| | | | 705/16 |
| 2014/0177720 A1* | 6/2014 | Zhang | H04N 19/52 |
| | | | 375/240.16 |
| 2016/0203496 A1* | 7/2016 | Guerrero | G06Q 20/389 |
| | | | 705/39 |
| 2017/0178134 A1* | 6/2017 | Senci | G06Q 20/4016 |
| 2017/0372318 A1* | 12/2017 | Shami | G06N 3/08 |
| 2019/0318358 A1* | 10/2019 | Chamberlain | G06Q 20/3223 |
| 2020/0167786 A1* | 5/2020 | Kursun | H04L 63/08 |
| 2020/0302450 A1* | 9/2020 | Misra | G06Q 30/0185 |
| 2021/0142329 A1* | 5/2021 | Aparício | G06N 5/025 |
| 2021/0192522 A1* | 6/2021 | Jameson | G06Q 40/12 |
| 2021/0357940 A1* | 11/2021 | Benkreira | H04W 12/08 |
| 2022/0358507 A1* | 11/2022 | Poduval | G06Q 20/4016 |
| 2023/0013119 A1* | 1/2023 | Gaur | G06Q 20/4016 |

* cited by examiner

SYSTEM, METHOD, AND COMPUTER PROGRAM PRODUCT FOR REAL-TIME ACCOUNT LEVEL RULE EXCLUSION FOR REAL-TIME PAYMENTS

BACKGROUND

1. Field

This disclosure relates to Real-Time Payments (RTP) and, in some non-limiting embodiments or aspects, to real-time account level rule exclusion for RTP.

2. Technical Considerations

The use of Real-Time Payments (RTP) is increasing around the world. However, the use of chargeback or reversal protection and risk rules with RTP is challenging. Money laundering and exploitation by fraudsters using RTP is much easier than conventional payment systems because RTP has much shorter windows in which clearing and settlement (CS) occur, and in which the risk rules, anti-money laundering rules, and/or CS rules must be executed in parallel. Accordingly, there is a need for the RTP system to be as low latency as possible, while still processing chargeback or reversal protection and risk rules, as well as directives to override chargeback rules. For example, financial institutions may need to avoid the application specific rules based on geographic location, government regulations in specific countries, and/or other configurations that financial institutions may have to support. However, existing RTP networks use a high latency rule exclusion system that relies on a legacy infrastructure, which cannot provide a real-time solution for rule exclusions.

SUMMARY

Accordingly, provided are improved systems, devices, products, apparatus, and/or methods for Real-Time Payments (RTP).

According to some non-limiting embodiments or aspects, provided is a computer-implemented method, including: storing, with at least one processor, in a distributed cache, at least one rule associated with a plurality of accounts in a Real-Time Payments (RTP) network, wherein the at least one rule is stored in association with account data associated with the plurality of accounts, and wherein the at least one rule is configured for use in processing transactions in the RTP network associated with the plurality of accounts; receiving, with the at least one processor, at least one account level exclusion directive associated with at least one account of the plurality of accounts, wherein application of the at least one account level exclusion directive is configured to exclude use of the at least one rule for processing transactions associated with the at least one account; storing, with the at least one processor, in the distributed cache, the at least one account level exclusion directive in association with the at least one account; receiving, with the at least one processor, transaction data associated with a transaction in the RTP network between the at least one account and at least one other account; retrieving, with the at least one processor, from the distributed cache, the at least one rule, the at least one account level exclusion directive, and the account data associated with the at least one account, wherein whether to apply the at least one account level exclusion to the transaction is determined based on the at least one account being associated with the at least one account level exclusion directive; in response to determining to apply the at least one account level exclusion to the transaction, excluding, with the at least one processor, use of the at least one rule for processing the transaction in the RTP network between the at least one account and the at least one other account; and processing, with the at least one processor, without applying the at least one rule, the transaction in the RTP network.

In some non-limiting embodiments or aspects, the method further includes: storing, with the at least one processor, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, and wherein the account data associated with the plurality of accounts is determined based on the graph.

In some non-limiting embodiments or aspects, the at least one rule, when used for processing the transactions, is configured to cause the at least one processor to authorize or deny the transactions in the RTP network based on transaction chargebacks associated with the plurality of accounts, and wherein the account data is associated with the transaction chargebacks associated with the plurality of accounts.

In some non-limiting embodiments or aspects, wherein whether to apply the at least one account level exclusion is further determined based on at least one parameter associated with the transaction.

In some non-limiting embodiments or aspects, wherein the at least one parameter associated with the transaction includes at least one of the following parameters: a date and/or timestamp associated with the transaction, a financial institution associated with the at least one account, a financial institution associated with the at least one other account, a geographic location associated with the at least one account, a geographic location associated with the at least one other account, an amount associated with the transaction, or any combination thereof.

In some non-limiting embodiments or aspects, the method further includes: storing, with the at least one processor, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

In some non-limiting embodiments or aspects, the at least one processor retrieves the at least one rule, the at least one account level exclusion directive, and the account data associated with the at least one account with a single call to the distributed cache.

According to some non-limiting embodiments or aspects, provided is a system including: at least one processor programmed and/or configured to: store, in a distributed cache, at least one rule associated with a plurality of accounts in a Real-Time Payments (RTP) network, wherein the at least one rule is stored in association with account data associated with the plurality of accounts, and wherein the at least one rule is configured for use in processing transactions in the RTP network associated with the plurality of accounts; receive at least one account level exclusion directive associated with at least one account of the plurality of accounts, wherein application of the at least one account level exclusion directive is configured to exclude use of the at least one rule for processing transactions associated with the at least one account; store, in the distributed cache, the at least one account level exclusion directive in association with the at least one account; receive, transaction data associated with a transaction in the RTP network between the at least one account and at least one other account; retrieve, from the distributed cache, the at least one rule, the at least one account level exclusion directive, and the account data associated with the at least one account, wherein whether to apply the at least one account level exclusion to the transaction is determined based on the at least one account being associated with the at least one account level exclusion directive; in response to determining to apply the at least one account level exclusion to the transaction, exclude use of the at least one rule for processing the transaction in the RTP network between the at least one account and the at least one other account; and process, without applying the at least one rule, the transaction in the RTP network.

In some non-limiting embodiments or aspects, the at least one processor is further programmed and/or configured to: store, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, and wherein the account data associated with the plurality of accounts is determined based on the graph.

In some non-limiting embodiments or aspects, the at least one rule, when used for processing the transactions, is configured to cause the at least one processor to authorize or deny the transactions in the RTP network based on transaction chargebacks associated with the plurality of accounts, and wherein the account data is associated with the transaction chargebacks associated with the plurality of accounts.

In some non-limiting embodiments or aspects, whether to apply the at least one account level exclusion is further determined based on at least one parameter associated with the transaction.

In some non-limiting embodiments or aspects, the at least one parameter associated with the transaction includes at least one of the following parameters: a date and/or timestamp associated with the transaction, a financial institution associated with the at least one account, a financial institution associated with the at least one other account, a geographic location associated with the at least one account, a geographic location associated with the at least one other account, an amount associated with the transaction, or any combination thereof.

In some non-limiting embodiments or aspects, the at least one processor is further programmed and/or configured to: store, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

In some non-limiting embodiments or aspects, the at least one processor retrieves the at least one rule, the at least one account level exclusion directive, and the account data associated with the at least one account with a single call to the distributed cache.

According to some non-limiting embodiments or aspects, provided is a computer program product comprising at least one non-transitory computer-readable medium including program instructions that, when executed by at least one processor, cause the at least one processor to: store, in a distributed cache, at least one rule associated with a plurality of accounts in a Real-Time Payments (RTP) network, wherein the at least one rule is stored in association with account data associated with the plurality of accounts, and wherein the at least one rule is configured for use in processing transactions in the RTP network associated with the plurality of accounts; receive at least one account level exclusion directive associated with at least one account of the plurality of accounts, wherein application of the at least one account level exclusion directive is configured to exclude use of the at least one rule for processing transactions associated with the at least one account; store, in the distributed cache, the at least one account level exclusion directive in association with the at least one account; receive, transaction data associated with a transaction in the RTP network between the at least one account and at least one other account; retrieve, from the distributed cache, the at least one rule, the at least one account level exclusion directive, and the account data associated with the at least one account, wherein whether to apply the at least one account level exclusion to the transaction is determined based on the at least one account being associated with the at least one account level exclusion directive; in response to determining to apply the at least one account level exclusion to the transaction, exclude use of the at least one rule for processing the transaction in the RTP network between the at least one account and the at least one other account; and process, without applying the at least one rule, the transaction in the RTP network.

In some non-limiting embodiments or aspects, the program instructions, when executed by the at least one processor, further cause the at least one processor to: store, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, and wherein the account data associated with the plurality of accounts is determined based on the graph.

In some non-limiting embodiments or aspects, the at least one rule, when used for processing the transactions, is configured to cause the at least one processor to authorize or deny the transactions in the RTP network based on transaction chargebacks associated with the plurality of accounts, wherein the account data is associated with the transaction chargebacks associated with the plurality of accounts, and wherein the at least one processor retrieves the at least one rule, the at least one account level exclusion directive, and the account data associated with the at least one account with a single call to the distributed cache.

In some non-limiting embodiments or aspects, whether to apply the at least one account level exclusion is further determined based on at least one parameter associated with the transaction.

In some non-limiting embodiments or aspects, the at least one parameter associated with the transaction includes at least one of the following parameters: a date and/or timestamp associated with the transaction, a financial institution associated with the at least one account, a financial institution associated with the at least one other account, a geographic location associated with the at least one account, a geographic location associated with the at least one other account, an amount associated with the transaction, or any combination thereof.

In some non-limiting embodiments or aspects, the program instructions, when executed by the at least one processor, further cause the at least one processor to: store, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

Further non-limiting embodiments or aspects are set forth in the following numbered clauses:

Clause 1. A computer-implemented method, comprising: storing, with at least one processor, in a distributed cache, at least one rule associated with a plurality of accounts in a Real-Time Payments (RTP) network, wherein the at least one rule is stored in association with account data associated with the plurality of accounts, and wherein the at least one rule is configured for use in processing transactions in the RTP network associated with the plurality of accounts; receiving, with the at least one processor, at least one account level exclusion directive associated with at least one account of the plurality of accounts, wherein application of the at least one account level exclusion directive is configured to exclude use of the at least one rule for processing transactions associated with the at least one account; storing, with the at least one processor, in the distributed cache, the at least one account level exclusion directive in association with the at least one account; receiving, with the at least one processor, transaction data associated with a transaction in the RTP network between the at least one account and at least one other account; retrieving, with the at least one processor, from the distributed cache, the at least one rule, the at least one account level exclusion directive, and the account data associated with the at least one account, wherein whether to apply the at least one account level exclusion to the transaction is determined based on the at least one account being associated with the at least one account level exclusion directive; in response to determining to apply the at least one account level exclusion to the transaction, excluding, with the at least one processor, use of the at least one rule for processing the transaction in the RTP network between the at least one account and the at least one other account; and processing, with the at least one processor, without applying the at least one rule, the transaction in the RTP network.

Clause 2. The computer-implemented method of clause 1, further comprising: storing, with the at least one processor, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, and wherein the account data associated with the plurality of accounts is determined based on the graph.

Clause 3. The computer-implemented method of clauses 1 or 2, wherein the at least one rule, when used for processing the transactions, is configured to cause the at least one processor to authorize or deny the transactions in the RTP network based on transaction chargebacks associated with the plurality of accounts, and wherein the account data is associated with the transaction chargebacks associated with the plurality of accounts.

Clause 4. The computer-implemented method of any of clauses 1-3, wherein whether to apply the at least one account level exclusion is further determined based on at least one parameter associated with the transaction.

Clause 5. The computer-implemented method of any of clauses 1-4, wherein the at least one parameter associated with the transaction includes at least one of the following parameters: a date and/or timestamp associated with the transaction; a financial institution associated with the at least one account; a financial institution associated with the at least one other account; a geographic location associated with the at least one account; a geographic location associated with the at least one other account; an amount associated with the transaction; or any combination thereof.

Clause 6. The computer-implemented method of any of clauses 1-5, further comprising: storing, with the at least one processor, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

Clause 7. The computer-implemented method of any of clauses 1-6, wherein the at least one processor retrieves the at least one rule, the at least one account level exclusion directive, and the account data associated with the at least one account with a single call to the distributed cache.

Clause 8. A system, comprising: at least one processor programmed and/or configured to: store, in a distributed cache, at least one rule associated with a plurality of accounts in a Real-Time Payments (RTP) network, wherein the at least one rule is stored in association with account data associated with the plurality of accounts, and wherein the at least one rule is configured for use in processing transactions in the RTP network associated with the plurality of accounts; receive at least one account level exclusion directive associated with at least one account of the plurality of accounts, wherein application of the at least one account level exclusion directive is configured to exclude use of the at least one rule for processing transactions associated with the at least one account; store, in the distributed cache, the at least one account level exclusion directive in association with the at least one account; receive, transaction data associated with a transaction in the RTP network between the at least one account and at least one other account; retrieve, from the distributed cache, the at least one rule, the at least one account level exclusion directive, and the account data associated with the at least one account, wherein whether to apply the at least one account level exclusion to the transaction is determined based on the at least one account being associated with the at least one account level exclusion directive; in response to determining to apply the at least one account level exclusion to the transaction, exclude use of the at least one rule for processing the transaction in the RTP network between the at least one account and the at least one other account; and process, without applying the at least one rule, the transaction in the RTP network.

Clause 9. The system of clause 8, wherein the at least one processor is further programmed and/or configured to: store, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, and wherein the account data associated with the plurality of accounts is determined based on the graph.

Clause 10. The system of clauses 8 or 9, wherein the at least one rule, when used for processing the transactions, is configured to cause the at least one processor to authorize or deny the transactions in the RTP network based on transaction chargebacks associated with the plurality of accounts, and wherein the account data is associated with the transaction chargebacks associated with the plurality of accounts.

Clause 11. The system of any of clauses 8-10, wherein whether to apply the at least one account level exclusion is further determined based on at least one parameter associated with the transaction.

Clause 12. The system of any of clauses 8-11, wherein the at least one parameter associated with the transaction includes at least one of the following parameters: a date and/or timestamp associated with the transaction; a financial institution associated with the at least one account; a financial institution associated with the at least one other account; a geographic location associated with the at least one account; a geographic location associated with the at least one other account; an amount associated with the transaction; or any combination thereof.

Clause 13. The system of any of clauses 8-12, wherein the at least one processor is further programmed and/or configured to: store, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

Clause 14. The system of any of clauses 8-13, wherein the at least one processor retrieves the at least one rule, the at least one account level exclusion directive, and the account data associated with the at least one account with a single call to the distributed cache.

Clause 15. A computer program product comprising at least one non-transitory computer-readable medium including program instructions that, when executed by at least one processor, cause the at least one processor to: store, in a distributed cache, at least one rule associated with a plurality of accounts in a Real-Time Payments (RTP) network, wherein the at least one rule is stored in association with account data associated with the plurality of accounts, and wherein the at least one rule is configured for use in processing transactions in the RTP network associated with the plurality of accounts; receive at least one account level exclusion directive associated with at least one account of the plurality of accounts, wherein application of the at least one account level exclusion directive is configured to exclude use of the at least one rule for processing transactions associated with the at least one account; store, in the distributed cache, the at least one account level exclusion directive in association with the at least one account; receive, transaction data associated with a transaction in the RTP network between the at least one account and at least one other account; retrieve, from the distributed cache, the at least one rule, the at least one account level exclusion directive, and the account data associated with the at least one account, wherein whether to apply the at least one account level exclusion to the transaction is determined based on the at least one account being associated with the at least one account level exclusion directive; in response to determining to apply the at least one account level exclusion to the transaction, exclude use of the at least one rule for processing the transaction in the RTP network between the at least one account and the at least one other account; and process, without applying the at least one rule, the transaction in the RTP network.

Clause 16. The computer program product of clause 15, wherein the program instructions, when executed by the at least one processor, further cause the at least one processor to: store, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, and wherein the account data associated with the plurality of accounts is determined based on the graph.

Clause 17. The computer program product of clauses 15 or 16, wherein the at least one rule, when used for processing the transactions, is configured to cause the at least one processor to authorize or deny the transactions in the RTP network based on transaction chargebacks associated with the plurality of accounts, wherein the account data is associated with the transaction chargebacks associated with the plurality of accounts, and wherein the at least one processor retrieves the at least one rule, the at least one account level exclusion directive, and the account data associated with the at least one account with a single call to the distributed cache.

Clause 18. The computer program product of any of clauses 15-17, wherein whether to apply the at least one account level exclusion is further determined based on at least one parameter associated with the transaction.

Clause 19. The computer program product of any of clauses 15-18, wherein the at least one parameter associated with the transaction includes at least one of the following parameters: a date and/or timestamp associated with the transaction; a financial institution associated with the at least one account; a financial institution associated with the at least one other account; a geographic location associated with the at least one account; a geographic location associated with the at least one other account; an amount associated with the transaction; or any combination thereof.

Clause 20. The computer program product of any of clauses 15-19, wherein the program instructions, when executed by the at least one processor, further cause the at least one processor to: store, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the terms "financial institution system", "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a PAN, to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides goods and/or services, or access to goods and/or services, to users (e.g. customers) based on a transaction (e.g. a payment transaction). As used herein, the terms "merchant" or "merchant system" may also refer to one or more computer systems, computing devices, and/or software application operated by or on behalf of a merchant, such as a server computer executing one or more software applications. A "point-of-sale (POS) system," as used herein, may refer to one or more computers and/or peripheral devices used by a merchant to engage in payment transactions with users, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction. A POS system may be part of a merchant system. A merchant system may also include a merchant plug-in for facilitating online, Internet-based transactions through a merchant webpage or software application. A merchant plug-in may include software that runs on a merchant server or is hosted by a third-party for facilitating such online transactions.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. A computing device may also be a desktop computer or other form of non-mobile computer.

As used herein, the term "server" and/or "processor" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "application programming interface" (API) may refer to computer code that allows communication between different systems or (hardware and/or software) components of systems. For example, an API may include function calls, functions, subroutines, communication protocols, fields, and/or the like usable and/or accessible by other systems or other (hardware and/or software) components of systems.

As used herein, the term "user interface" or "graphical user interface" refers to a generated display, such as one or more graphical user interfaces (GUIs) with which a user may interact, either directly or indirectly (e.g., through a keyboard, mouse, touchscreen, etc.).

Provided are improved systems, devices, products, apparatus, and/or methods for Real-Time Payments (RTP) that store, in a distributed cache, at least one rule associated with a plurality of accounts in the RTP network, wherein the at least one rule is stored in association with account data associated with the plurality of accounts, and wherein the at least one rule is configured for use in processing transactions in the RTP network associated with the plurality of accounts; receive at least one account level exclusion directive associated with at least one account of the plurality of accounts, wherein application of the at least one account level exclusion directive is configured to exclude use of the at least one rule for processing transactions associated with the at least one account; store, in the distributed cache, the at least one account level exclusion directive in association with the at least one account; receive, transaction data associated with a transaction in the RTP network between the at least one account and at least one other account; retrieve, from the distributed cache, the at least one rule, the at least one account level exclusion directive, and the account data associated with the at least one account, wherein whether to apply the at least one account level exclusion to the transaction is determined based on the at least one account being associated with the at least one account level exclusion directive; in response to determining to apply the at least one account level exclusion to the transaction, exclude use of the at least one rule for processing the transaction in the RTP network between the at least one account and the at least one other account; and process, without applying the at least one rule, the transaction in the RTP network.

In this way, non-limiting embodiments or aspects of the present disclosure may provide an improved RTP system in which account level directives can be created and used in real-time processing of chargeback or reversal rules, risk rules, anti-money launder rules, clearing and settlement (CS) rules, and/or the like. Unlike existing RTP systems, in which directives only work based on transaction attributes, these directives may be used with bank account numbers, PAN numbers, and/or any other unique account identifiers, and may be created through an intuitive UI and published in real-time for online transaction processing flow, which enables real-time exclusion of rules in case something about the rules have to be suppressed real-time. Accordingly, non-limiting embodiments or aspects of the present disclosure may further provide an enhancement of lower latency over existing RTP systems, which may have a service level agreement (SLA) of about two minutes for PAN publication in contrast to the real-time or near real-time capability of non-limiting embodiments or aspects of the present disclosure, as well as enable exclusion directives to be created on multiple parameters that can be configured during execution of the RTP system.

Figure 1:
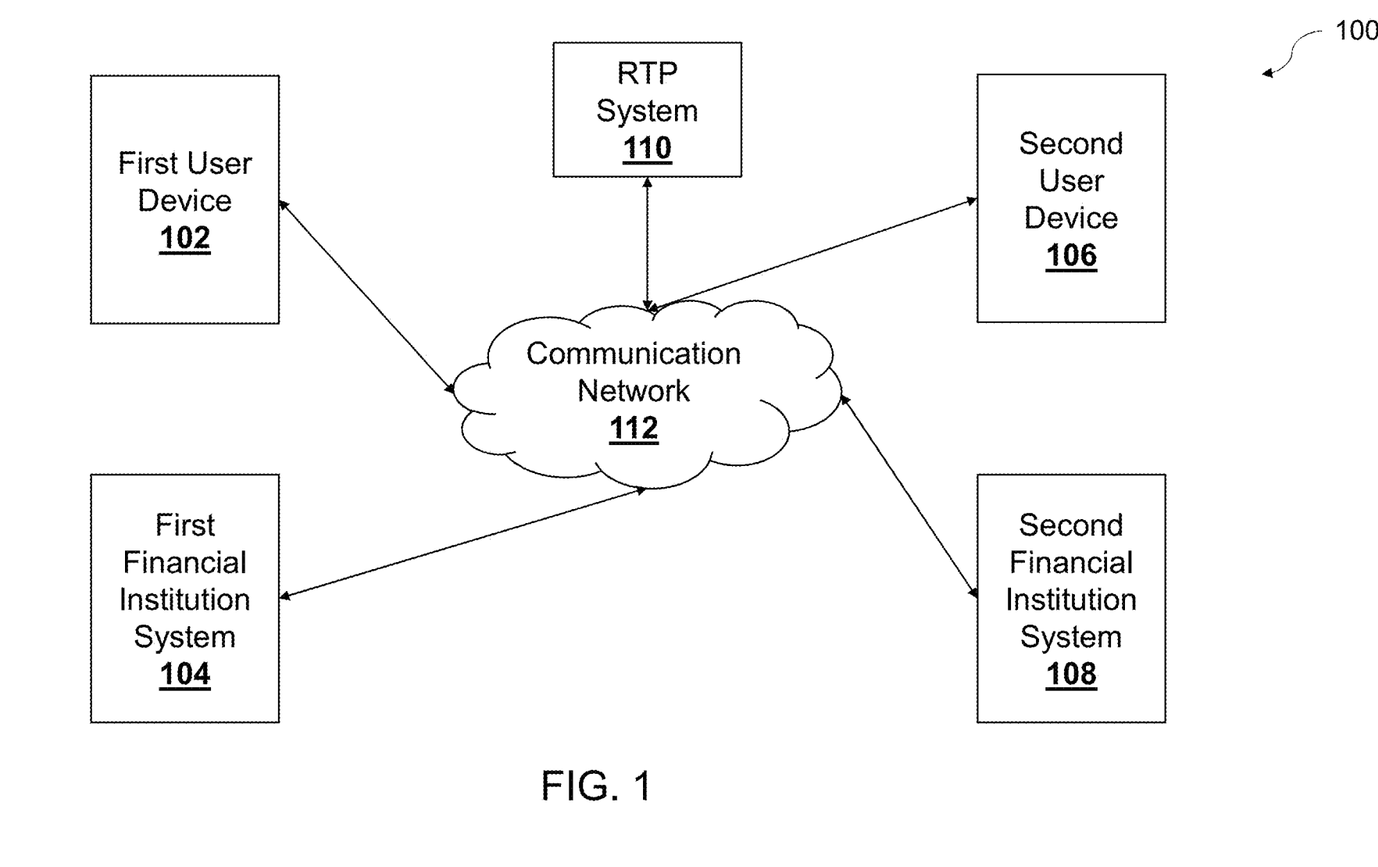
FIG. 1 is a diagram of non-limiting embodiments or aspects of an environment in which systems, devices, products, apparatus, and/or methods, described herein, may be implemented.

Referring now to FIG. 1, FIG. 1 is a diagram of an example environment 100 in which devices, systems, methods, and/or products described herein, may be implemented. As shown in FIG. 1, environment 100 may include first user device 102, first financial institution system 104, second user device 106, second financial institution system 108, RTP system 110, and/or communication network 112. First user device 102, first financial institution system 104, second user device 106, second financial institution system 108, and RTP system 110 may interconnect (e.g., establish a connection to communicate, etc.) via wired connections, wireless connections, or a combination of wired and wireless connections.

First user device 102 may include one or more devices capable of receiving information and/or data from first financial institution system 104, second user device 106, second financial institution system 108, and/or RTP system 110 via communication network 112 and/or communicating information and/or data to first financial institution system 104, second user device 106, second financial institution system 108, and/or RTP system 110 via communication network 112. For example, first user device 102 may include a client device and/or the like. In some non-limiting embodiments or aspects, first user device 102 may include one or more devices, such as computers, computer systems, and/or peripheral devices capable of being used by a merchant to conduct a payment transaction with a user. For example, first user device 102 may include a POS device and/or a POS system.

First financial institution system 104 may include one or more devices capable of receiving information and/or data from first user device 102, second user device 106, second financial institution system 108, and/or RTP system 110 via communication network 112 and/or communicating information and/or data to first user device 102, second user device 106, second financial institution system 108, and/or RTP system 110 via communication network 112. For example, first financial institution system 104 may include a computing device, such as a server, a group of servers, and/or other like devices. In some non-limiting embodiments or aspects, first financial institution system 104 may be associated with an issuer institution as described herein. For example, first financial institution system 104 may be associated with an issuer institution that issued a payment account or instrument (e.g., a credit account, a debit account, a credit card, a debit card, etc.) to a user (e.g., a user associated with first user device 102, a merchant, etc.).

Second user device 106 may include one or more devices capable of receiving information and/or data from first financial institution system 104, first user device 102, second financial institution system 108, and/or RTP system 110 via communication network 112 and/or communicating information and/or data to first financial institution system 104, first user device 102, second financial institution system 108, and/or RTP system 110 via communication network 112. For example, second user device 106 may include a client device and/or the like. In some non-limiting embodiments or aspects, second user device 106 may be any portable or mobile processing device that a customer may carry. For example, second user device 106 may be a smart phone, a tablet, a smart watch, etc.

Second financial institution system 108 may include one or more devices capable of receiving information and/or data from first user device 102, second user device 106, first financial institution system 104, and/or RTP system 110 via communication network 112 and/or communicating information and/or data to first user device 102, second user device 106, first financial institution system 104, and/or RTP system 110 via communication network 112. For example, second financial institution system 108 may include a computing device, such as a server, a group of servers, and/or other like devices. In some non-limiting embodiments or aspects, second financial institution system 108 may be associated with an issuer institution as described herein. For example, second financial institution system 108 may be associated with an issuer institution that issued a payment account or instrument (e.g., a credit account, a debit account, a credit card, a debit card, etc.) to a user (e.g., a user associated with second user device 106, a customer, etc.).

RTP system 110 may include one or more devices capable of receiving information and/or data from first user device 102, first financial institution system 104, second user device 106, and/or second financial institution system 108 via communication network 112 and/or communicating information and/or data to first user device 102, first financial institution system 104, second user device 106, and/or second financial institution system 108 via communication network 112. For example, RTP system 110 may include a computing device, such as a server (e.g., a transaction processing server, etc.), a group of servers, and/or other like devices. In some non-limiting embodiments or aspects, RTP system 110 may include a RTP network in which payments between financial institutions are settled immediately. In some non-limiting embodiments or aspects, second financial institution system 108 may include and/or access one or more internal and/or external databases including transaction data.

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and systems shown in FIG. 1 is provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices or systems) of environment 100 may perform one or more functions described as being performed by another set of devices and/or systems of environment 100.

Figure 2:
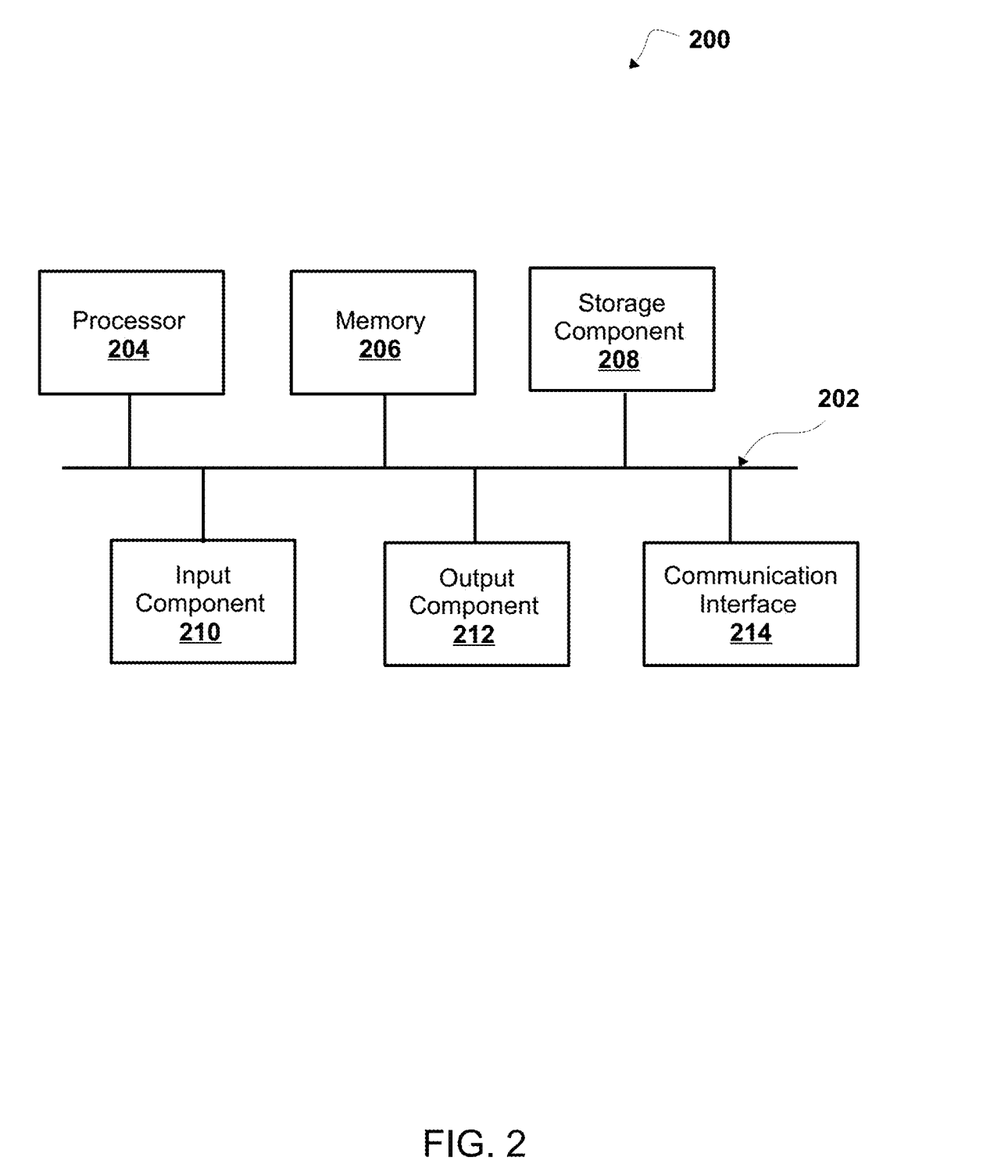
FIG. 2 is a diagram of non-limiting embodiments or aspects of components of one or more devices and/or one or more systems of FIG. 1.

Referring now to FIG. 2, FIG. 2 is a diagram of example components of a device 200. Device 200 may correspond to first user device 102 (e.g., one or more devices of a system of first user device 102, etc.), one or more devices of first financial institution system 104, second user device 106 (e.g., one or more devices of a system of second user device 106, etc.), one or more devices of second financial institution system 108, and/or one or more devices of RTP system 110. In some non-limiting embodiments or aspects, first user device 102 (e.g., one or more devices of a system of first user device 102, etc.), one or more devices of first financial institution system 104, second user device 106 (e.g., one or more devices of a system of second user device 106, etc.), one or more devices of second financial institution system 108, and/or one or more devices of RTP system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
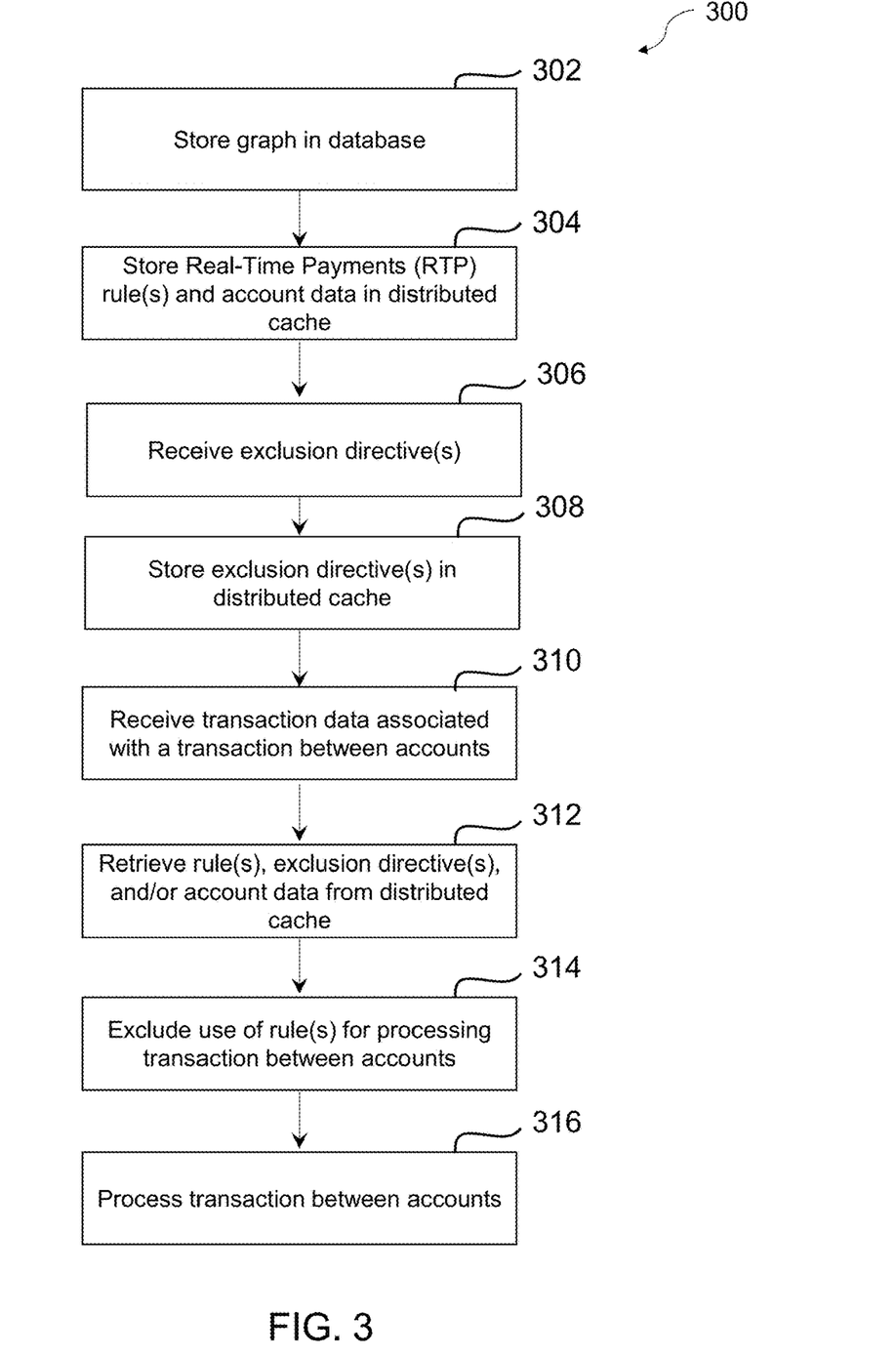
FIG. 3 is a flowchart of non-limiting embodiments or aspects of a process for Real-Time Payments (RTP)

Referring now to FIG. 3, FIG. 3 is a flowchart of non-limiting embodiments or aspects of a process 300 for RTP. In some non-limiting embodiments or aspects, one or more of the steps of process 300 may be performed (e.g., completely, partially, etc.) by RTP system 110 (e.g., one or more devices of RTP system 110). In some non-limiting embodiments or aspects, one or more of the steps of process 300 may be performed (e.g., completely, partially, etc.) by another device or a group of devices separate from or including RTP system 110, such as, first user device 102 (e.g., one or more devices of a system of first user device 102, etc.), first financial institution system 104 (e.g., one or more devices of first financial institution system 104), second user device 106 (e.g., one or more devices of a system of second user device 106, etc.), and/or second financial institution system 108 (e.g., one or more devices of second financial institution system 108).

As shown in FIG. 3, at step 302, process 300 includes storing a graph in a database. For example, RTP system 110 may store, in a database, a graph including a plurality of edges and a plurality of nodes for the plurality of edges. The plurality of nodes may be associated with a plurality of accounts in an RTP network. The plurality of edges may be associated with a plurality of prior transactions between the plurality of accounts in the RTP network.

In some non-limiting embodiments or aspects, the plurality of edges may be associated with one or more transaction chargebacks (e.g., one or more transaction chargebacks associated with one or more prior transactions of the plurality of prior transactions, etc.). For example, a transaction chargeback or reversal may be associated with a request to a first user (e.g., a merchant, etc.) associated with a first account to refund or return a payment made in a prior transaction in the RTP network to a second user (e.g., a customer, etc.) associated with a second account. As an example, RTP system 110 may use intelligent network graphs to track transaction chargebacks or reversals (e.g., a number of chargebacks or reversals associated with the second account, a total payment amount of chargebacks or reversals associated with the second account, etc.) including payments therefor that passed through one or more intermediary accounts between the first account and the second account (e.g., to track fund layering, etc.).

As shown in FIG. 3, at step 304, process 300 includes storing, in a distributed cache, at least one rule and account data. For example, RTP system 110 may store, in a distributed cache, at least one rule associated with a plurality of accounts in the RTP network. The at least one rule may be stored in association with account data associated with the plurality of accounts. In such an example, the account data may be associated with the transaction chargebacks associated with the plurality of accounts (e.g., a number and/or total payment amount of chargebacks or reversals associated with each account, etc.), and/or the account data may be determined based on the graph. The at least one rule may be configured for use in processing transactions in the RTP network associated with the plurality of accounts. In such an example, the at least one rule, when used for processing the transactions, may be configured to cause RTP system 110 to authorize or deny the transactions in the RTP network based on transaction chargebacks or reversals associated with the plurality of accounts. For example, the at least one rule, when used for processing the transactions, may be configured to cause RTP system 110 to deny transactions in the RTP network for originating accounts that are associated with a number of chargebacks or reversals greater than a threshold number and/or a total payment amount of chargebacks or reversals greater than a threshold total payment amount.

In some non-limiting embodiments or aspects, RTP system 110 may store, in the distributed cache, at least one other rule associated with at least one other account in the RTP network. The at least one other rule may be stored in association with account data associated with the at least one other account, and/or the at least one other rule may be configured for use in processing transactions in the RTP network associated with the at least one other account. In such an example, the at least one other rule may be configured to cause RTP system 110 to authorize or deny transactions in the RTP network associated with the at least one other account based on a fraud level associated with the at least one other account, and/or the account data associated with the at least one other account may include the fraud level. For example, an originating account may be associated with one or more rules and/or directives (e.g., one or more rules set by a financial institution of the originating account to detect fraud, etc.) and/or a receiving account may be associated with one or more rules or directives (e.g., one or more rules set by a financial institution of the receiving account to detect if the originating account has a history of chargebacks or reversals, etc.).

As shown in FIG. 3, at step 306, process 300 includes receiving at least one exclusion directive. For example, RTP system 110 may receive at least one account level exclusion directive associated with at least one account of the plurality of accounts. In such an example, application of the at least one account level exclusion directive may be configured to exclude use of the at least one rule for processing transactions associated with the at least one account.

Figure 4:
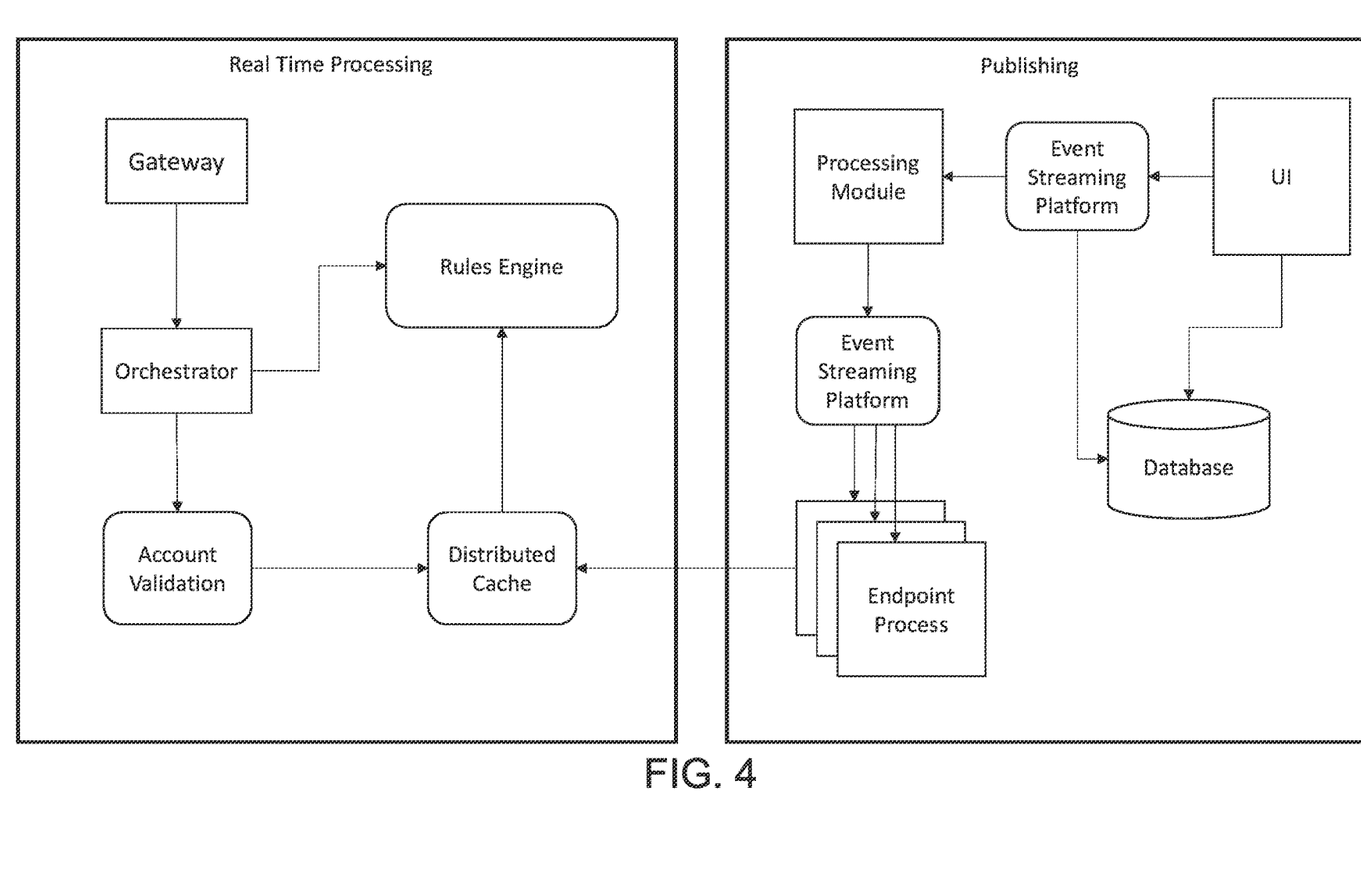
FIG. 4 is a diagram of an implementation of non-limiting embodiments or aspects of a process for RTP.

Referring also to FIG. 4, FIG. 4 is a diagram of an implementation 400 of non-limiting embodiments or aspects of a process for RTP. As shown in FIG. 4, rules and/or exclusion directives may be created by a user (e.g., a financial institution, etc.) through a user interface (UI) provided by RTP system 110 and accessed via a user device (e.g., second user device 106, etc.). RTP system 110 may use an event streaming platform to generate real-time events associated with the rules and/or directives and publish the real-time events to respective endpoints of RTP system 110.

As shown in FIG. 3, at step 308, process 300 includes storing, in a distributed cache, at least one exclusion directive. For example, RTP system 110 may store, in the distributed cache, the at least one account level exclusion directive in association with the at least one account. As an example, and referring again to FIG. 4, the real-time events generated by the event streaming platform may be picked up by a processing module of RTP system 110, which creates an endpoint specific message to the endpoints. For example, each endpoint may include an endpoint process that polls the event streaming platform for published events and persists the published events to the distributed cache for low latency access of the rules and/or exclusion directives associated with the events. The RTP system 110 may persist the data in the distributed cache in a format that enables querying and retrieving required values for the rules and/or directives in a single call to the distributed cache. In such an example, the persisted data may be stored in a compressed data format, such as the Protobuf format, and/or the like, which reduces computational overhead to create and decode packets of the data, thereby providing less end-to-end delay.

As shown in FIG. 3, at step 310, process 300 includes receiving transaction data associated with a transaction between accounts. For example, RTP system 110 may receive transaction data associated with a transaction in the RTP network between the at least one account and at least one other account. As an example, the transaction data may include an RTP payment or request to transfer a payment amount from the at least one account to the at least one other account. In such an example, and referring again to FIG. 4, the transaction data or RTP request may be received by a gateway process of RTP system 110, which forwards the RTP request to an orchestrator process according to the transaction flow.

Transaction data may include at least one of the following parameters associated with a transaction (e.g., a RTP transaction, etc.): a unique identifier associated with the transaction; a date and/or timestamp associated with the transaction; a financial institution associated with at least one account (e.g., with an originating account, etc.); a financial institution associated with at least one other account (e.g., with a receiving account, etc.); a geographic location associated with the at least one account; a geographic location associated with the at least one other account; a routing transit number (RTN) or equivalent thereof of a sending bank (e.g., of an originating financial institution system, etc.); an amount associated with the transaction; or any combination thereof.

As shown in FIG. 3, at step 312, process 300 includes retrieving, from a distributed cache, at least one rule, account data, and/or at least one exclusion directive. For example, RTP system 110 may retrieve, from the distributed cache, the at least one rule (and/or the at least one other rule), the at least one account level exclusion directive, and the account data associated with the at least one account. As an example, RTP system 110 may query the distributed cache for rules, directives, and/or account data associated with the at least one account and/or the at least one other account. In such an example, RTP system 110 may retrieve the at least one rule, the at least one account level exclusion directive, and the account data associated with the at least one account with a single call to the distributed cache. In such an example, and referring again to FIG. 4, the orchestrator may fetch the account data from the distributed cache.

RTP system 110 may determine whether to apply the at least one account level exclusion to the transaction based on the at least one account being associated with the at least one account level exclusion directive. In some non-limiting embodiments or aspects, RTP system 110 may determine whether to apply the at least one account level exclusion further based on at least one parameter associated with the transaction. For example, RTP system 110 may compare at least one parameter associated with the transaction to one or more parameters defined by the at least one account level exclusion, and if the parameter(s) match for the transaction, apply the at least one account level exclusion directive for processing the transaction. As an example, the at least one parameter associated with the transaction may include at least one of the following parameters: a date and/or timestamp associated with the transaction; a financial institution associated with the at least one account; a financial institution associated with the at least one other account; a geographic location associated with the at least one account; a geographic location associated with the at least one other account; an amount associated with the transaction; or any combination thereof.

As shown in FIG. 3, at step 314, process 300 includes excluding use of at least one rule for processing a transaction between accounts. For example, RTP system 110 may, in response to determining to apply the at least one account level exclusion to the transaction, exclude or block use of the at least one rule for processing the transaction in the RTP network between the at least one account and the at least one other account.

As shown in FIG. 3, at step 316, process 300 includes processing a transaction between accounts. For example, RTP system 110 may process, without applying the at least one rule, the transaction in the RTP network (e.g., by authorizing or denying the transaction, by sending a rule-execution outcome response to a user for the user to make an authorization decision, etc.). As an example, RTP system 110 may process the transaction without applying the at least one rule to the transaction. In such an example, and referring again to FIG. 4, the orchestrator may use the account data fetched from the distributed cache with a rules engine and/or an account validation process to validate the account data against parameters attached to an account, such as timeframe, geolocation, and/or the like according to the rules and/or directives applied to the transaction (e.g., at least one other rule, etc.). If the parameters of the transaction match with the fetched metadata according to the rules and/or directives, an appropriate response may be generated and sent back the participants via the gateway. For example, RTP system 110 may authorize the transaction in the RTP network and transfer the payment from the at least one account to the at least one other account (e.g., perform clearing and settlement (CS) of the transaction, etc.).

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
    storing, with at least one processor, in a distributed cache, at least one rule associated with a plurality of accounts in a Real-Time Payments (RTP) network, wherein the at least one rule is stored in association with account data associated with the plurality of accounts, wherein the at least one rule is configured for use in processing transactions in the RTP network associated with the plurality of accounts,
    using the at least one rule, denying, by the at least one processor, the transactions in the RTP network for each account of the plurality of accounts that is an originating account for the transactions and is associated with at least one of: a number of transaction chargebacks greater than a threshold number, a total payment amount of chargebacks greater than a threshold total payment amount, or any combination thereof;
    storing, with the at least one processor, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, wherein the plurality of edges is further associated with one or more transaction chargebacks associated with one or more prior transactions of the plurality of prior transactions, wherein the one or more transaction chargebacks are associated with a request to a first user associated with a first account to refund or return a payment made in the one or more prior transactions to a second user associated with a second account, wherein the account data associated with the plurality of accounts is determined based on the graph, and wherein the account data associated with the plurality of accounts includes, for each account of the plurality of accounts, at least one of: the number of transaction chargebacks associated with that account, the total payment amount of transaction chargebacks associated with that account, or any combination thereof;

receiving, with the at least one processor, from an issuer institution, at least one account level exclusion directive associated with at least one account of the plurality of accounts, wherein the at least one account is provided by the issuer institution, and wherein application of the at least one account level exclusion directive is configured to exclude use of the at least one rule for processing transactions associated with the at least one account;

storing, with the at least one processor, in the distributed cache, the at least one account level exclusion directive in association with the at least one account, wherein the at least one processor receives a real-time event associated with the at least one account level exclusion directive, generated by an event streaming platform, and published in real-time to an endpoint including the at least one processor, wherein the at least one processor polls the event streaming platform for the real-time event and persists the real-time event, the at least one account level exclusion directive, and account data associated with the at least one account to the distributed cache to store, in the distributed cache, in a compressed data format, the at least one account level exclusion directive and the account data associated with the at least one account for low latency access of the at least one account level exclusion directive, enabling querying and retrieving, with a single call to the distributed cache, the at least one rule, the at least one account level exclusion directive, and the account data associated with the at least one account to reduce computational overhead and to reduce end-to-end delay;

receiving, with the at least one processor, transaction data associated with a transaction in the RTP network between the at least one account and at least one other account, wherein the transaction data includes an RTP payment or a request to transfer a payment amount from the at least one account to the at least one other account;

retrieving, with the at least one processor, from the distributed cache, with the single call to the distributed cache, the at least one rule, the at least one account level exclusion directive, and the account data associated with the at least one account, wherein whether to apply the at least one account level exclusion directive to the transaction is determined based on the at least one account being associated with the at least one account level exclusion directive;

determining to apply the at least one account level exclusion directive to the transaction based on the at least one account being associated with the at least one account level exclusion directive;

in response to determining to apply the at least one account level exclusion directive to the transaction, excluding, with the at least one processor, use of the at least one rule for processing the transaction in the RTP network between the at least one account and the at least one other account; and processing, with the at least one processor, without applying the at least one rule, the transaction in the RTP network.

2. The computer-implemented method of claim 1, wherein whether to apply the at least one account level exclusion directive is further determined based on at least one parameter associated with the transaction.

3. The computer-implemented method of claim 2, wherein the at least one parameter associated with the transaction includes at least one of the following parameters: a date and/or timestamp associated with the transaction; a financial institution associated with the at least one account; a financial institution associated with the at least one other account; a geographic location associated with the at least one account; a geographic location associated with the at least one other account; an amount associated with the transaction; or any combination thereof.

4. The computer-implemented method of claim 1, further comprising:

storing, with the at least one processor, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

5. A system, comprising:

at least one processor programmed and/or configured to:
store, in a distributed cache, at least one rule associated with a plurality of accounts in a Real-Time Payments (RTP) network, wherein the at least one rule is stored in association with account data associated with the plurality of accounts, wherein the at least one rule is configured for use in processing transactions in the RTP network associated with the plurality of accounts, using the at least one rule, deny the transactions in the RTP network for each account of the plurality of accounts that is an originating account for the transactions and is associated with at least one of: a number of transaction chargebacks greater than a threshold number, a total payment amount of chargebacks greater than a threshold total payment amount, or any combination thereof;

store, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, wherein the plurality of edges is further associated with one or more transaction chargebacks associated with one or more prior transactions of the plurality of prior transactions, wherein the one or more transaction chargebacks are associated with a request to a first user associated with a first account to refund or return a payment made in the one or more prior transactions to a second user associated with a second account, wherein the account data associated with the plurality of accounts is determined based on the graph, and wherein the account data associated with the plurality of accounts includes, for each account of the plurality of accounts, at least one of: the number of transaction chargebacks associated with that account, the total payment amount of transaction chargebacks associated with that account, or any combination thereof;

receive, from an issuer institution, at least one account level exclusion directive associated with at least one account of the plurality of accounts, wherein the at least one account is provided by the issuer institution, and wherein application of the at least one account level exclusion directive is configured to exclude use of the at least one rule for processing transactions associated with the at least one account;

store, in the distributed cache, the at least one account level exclusion directive in association with the at least one account, wherein the at least one processor receives a real-time event associated with the at least one account level exclusion directive, generated by an event streaming platform, and published in real-time to an endpoint including the at least one processor, wherein the at least one processor polls the event streaming platform for the real-time event and persists the real-time event, the at least one account level exclusion directive, and account data associated with the at least one account to the distributed cache to store, in the distributed cache, in a compressed data format, the at least one account level exclusion directive and the account data associated with the at least one account for low latency access of the at least one account level exclusion directive, enabling querying and retrieving, with a single call to the distributed cache, the at least one rule, the at least one account level exclusion directive, and the account data associated with the at least one account to reduce computational overhead and to reduce end-to-end delay;

receive, transaction data associated with a transaction in the RTP network between the at least one account and at least one other account, wherein the transaction data includes an RTP payment or a request to transfer a payment amount from the at least one account to the at least one other account;

retrieve, from the distributed cache, with the single call to the distributed cache, the at least one rule, the at least one account level exclusion directive, and the account data associated with the at least one account, wherein whether to apply the at least one account level exclusion directive to the transaction is determined based on the at least one account being associated with the at least one account level exclusion directive;

determine to apply the at least one account level exclusion directive to the transaction based on the at least one account being associated with the at least one account level exclusion directive;

in response to determining to apply the at least one account level exclusion directive to the transaction, exclude use of the at least one rule for processing the transaction in the RTP network between the at least one account and the at least one other account; and process, without applying the at least one rule, the transaction in the RTP network.

6. The system of claim 5, wherein whether to apply the at least one account level exclusion directive is further determined based on at least one parameter associated with the transaction.

7. The system of claim 6, wherein the at least one parameter associated with the transaction includes at least one of the following parameters: a date and/or timestamp associated with the transaction; a financial institution associated with the at least one account; a financial institution associated with the at least one other account; a geographic location associated with the at least one account; a geographic location associated with the at least one other account; an amount associated with the transaction; or any combination thereof.

8. The system of claim 5, wherein the at least one processor is further programmed and/or configured to:
store, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

9. A computer program product comprising at least one non-transitory computer-readable medium including program instructions that, when executed by at least one processor, cause the at least one processor to:
store, in a distributed cache, at least one rule associated with a plurality of accounts in a Real-Time Payments (RTP) network, wherein the at least one rule is stored in association with account data associated with the plurality of accounts, wherein the at least one rule is configured for use in processing transactions in the RTP network associated with the plurality of accounts,
using the at least one rule, deny the transactions in the RTP network for each account of the plurality of accounts that is an originating account for the transactions and is associated with at least one of: a number of transaction chargebacks greater than a threshold number, a total payment amount of chargebacks greater than a threshold total payment amount, or any combination thereof;
store, in a database, a graph including a plurality of edges and a plurality of nodes for the plurality of edges, wherein the plurality of nodes is associated with the plurality of accounts in the RTP network, wherein the plurality of edges is associated with a plurality of prior transactions between the plurality of accounts in the RTP network, wherein the plurality of edges is further associated with one or more transaction chargebacks associated with one or more prior transactions of the plurality of prior transactions, wherein the one or more transaction chargebacks are associated with a request to a first user associated with a first account to refund or return a payment made in the one or more prior transactions to a second user associated with a second account, wherein the account data associated with the plurality of accounts is determined based on the graph, and wherein the account data associated with the plurality of accounts includes, for each account of the plurality of accounts, at least one of: the number of transaction chargebacks associated with that account, the total payment amount of transaction chargebacks associated with that account, or any combination thereof;

receive, from an issuer institution, at least one account level exclusion directive associated with at least one account of the plurality of accounts, wherein the at least one account is provided by the issuer institution, and wherein application of the at least one account level exclusion directive is configured to exclude use of the at least one rule for processing transactions associated with the at least one account;

store, in the distributed cache, the at least one account level exclusion directive in association with the at least one account, wherein the at least one processor receives a real-time event associated with the at least one account level exclusion directive, generated by an event streaming platform, and published in real-time to an endpoint including the at least one processor, wherein the at least one processor polls the event streaming platform for the real-time event and persists the real-time event, the at least one account level exclusion directive, and account data associated with the at least one account to the distributed cache to store, in the distributed cache, in a compressed data format, the at least one account level exclusion directive and the account data associated with the at least one account for low latency access of the at least one account level exclusion directive, enabling querying and retrieving, with a single call to the distributed cache, the at least one rule, the at least one account level exclusion directive, and the account data associated with the at least one account to reduce computational overhead and to reduce end-to-end delay;

receive, transaction data associated with a transaction in the RTP network between the at least one account and at least one other account, wherein the transaction data includes an RTP payment or a request to transfer a payment amount from the at least one account to the at least one other account;

retrieve, from the distributed cache, with the single call to the distributed cache, the at least one rule, the at least one account level exclusion directive, and the account data associated with the at least one account, wherein whether to apply the at least one account level exclusion directive to the transaction is determined based on the at least one account being associated with the at least one account level exclusion directive;

determine to apply the at least one account level exclusion directive to the transaction based on the at least one account being associated with the at least one account level exclusion directive;

in response to determining to apply the at least one account level exclusion directive to the transaction, exclude use of the at least one rule for processing the transaction in the RTP network between the at least one account and the at least one other account; and process, without applying the at least one rule, the transaction in the RTP network.

10. The computer program product of claim 9, wherein whether to apply the at least one account level exclusion directive is further determined based on at least one parameter associated with the transaction.

11. The computer program product of claim 10, wherein the at least one parameter associated with the transaction includes at least one of the following parameters: a date and/or timestamp associated with the transaction; a financial institution associated with the at least one account; a financial institution associated with the at least one other account; a geographic location associated with the at least one account; a geographic location associated with the at least one other account; an amount associated with the transaction; or any combination thereof.

12. The computer program product of claim 9, wherein the program instructions, when executed by the at least one processor, further cause the at least one processor to:

store, in the distributed cache, at least one other rule associated with the at least one other account in the RTP network, wherein the at least one other rule is stored in association with account data associated with the at least one other account, wherein the at least one other rule is configured for use in processing transactions in the RTP network associated with the at least one other account, wherein the at least one other rule is configured to cause the at least one processor to authorize or deny transactions in the RTP network associated with the at least one other account based on a fraud level associated with the at least one other account, and wherein the account data associated with the at least one other account includes the fraud level.

\* \* \* \* \*